US010581289B2

(12) United States Patent
Sakaguchi et al.

(10) Patent No.: US 10,581,289 B2
(45) Date of Patent: Mar. 3, 2020

(54) ROTATING ELECTRIC MACHINE ROTOR

(71) Applicant: Mitsubishi Electric Corporation, Tokyo (JP)

(72) Inventors: Masayuki Sakaguchi, Tokyo (JP); Mitsuyasu Okamoto, Tokyo (JP); Kenji Maekawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 506 days.

(21) Appl. No.: 15/323,327

(22) PCT Filed: Aug. 26, 2014

(86) PCT No.: PCT/JP2014/004378
§ 371 (c)(1),
(2) Date: Dec. 30, 2016

(87) PCT Pub. No.: WO2016/030920
PCT Pub. Date: Mar. 3, 2016

(65) Prior Publication Data
US 2017/0163113 A1    Jun. 8, 2017

(51) Int. Cl.
*H02K 3/18*  (2006.01)
*H02K 3/28*  (2006.01)
(Continued)

(52) U.S. Cl.
CPC ............... *H02K 3/18* (2013.01); *H02K 3/28* (2013.01); *H02K 3/30* (2013.01); *H02K 3/325* (2013.01); *H02K 19/22* (2013.01)

(58) Field of Classification Search
CPC ............. H02K 3/28; H02K 3/30; H02K 19/22
(Continued)

(56) References Cited

U.S. PATENT DOCUMENTS

2005/0218744 A1* 10/2005 Nakanishi ............... H02K 3/18
310/194
2005/0242680 A1* 11/2005 Militello ............... H02K 3/528
310/194

(Continued)

FOREIGN PATENT DOCUMENTS

CN    1628405 A    6/2005
EP    1 555 735 A1    7/2005
(Continued)

OTHER PUBLICATIONS

Communication dated Nov. 7, 2017 from the Japanese Patent Office in counterpart Application No. 2016-545083.
(Continued)

*Primary Examiner* — Gary A Nash
(74) *Attorney, Agent, or Firm* — Sughrue Mion, PLLC; Richard C. Turner (57) ABSTRACT

This rotating electric machine rotor has a rotor coil composed of; a lower coil field wound around the outer circumference of a winding drum portion of a bobbin; and a mountain-wound coil field wound around the outer circumference of the lower coil field. A cross point in the mountain-wound coil field and a cross point in the lower coil field are shifted from each other in the circumferential direction. Thus, it becomes possible to shift the cross point positions without changing the thickness of the winding drum portion of the bobbin and without using a tape or the like.

3 Claims, 5 Drawing Sheets

(51) Int. Cl.
*H02K 19/22* (2006.01)
*H02K 3/30* (2006.01)
*H02K 3/32* (2006.01)

(58) Field of Classification Search
USPC .... 310/156.66, 156.69, 156.71–156.77, 194, 310/257, 263, 195, 208
See application file for complete search history.

(56) References Cited

U.S. PATENT DOCUMENTS

| | | | | |
|---|---|---|---|---|
| 2008/0061651 | A1* | 3/2008 | York | H02K 3/528 310/194 |
| 2010/0164317 | A1* | 7/2010 | Inoue | H02K 1/243 310/194 |
| 2010/0320861 | A1* | 12/2010 | Nishikawa | H02K 21/044 310/194 |
| 2011/0018375 | A1* | 1/2011 | Kimura | H02K 3/528 310/71 |

FOREIGN PATENT DOCUMENTS

| | | |
|---|---|---|
| JP | 60-194511 A | 10/1985 |
| JP | 05-072731 B2 | 10/1993 |
| JP | 4347219 B2 | 10/2009 |

OTHER PUBLICATIONS

Communication dated Mar. 7, 2018 from the European Patent Office in counterpart Application No. 14900912.8.
International Search Report of PCT/JP2014/004378 dated Nov. 18, 2014 [PCT/ISA/210].
Communication dated May 31, 2018 from the State Intellectual Property Office of the P.R.C. in counterpart application No. 201480081347.1.
Communication dated May 10, 2019 from Indian Patent Office in counterpart IN Application No. 201747004510.

* cited by examiner

ROTATING ELECTRIC MACHINE ROTOR

CROSS REFERENCE TO RELATED APPLICATIONS

This application is a National Stage of International Application No. PCT/JP2014/004378, filed Aug. 26, 2014, the contents of which are incorporated herein by reference in its entirety.

TECHNICAL FIELD

The present invention relates to a rotating electric machine rotor provided in vehicles such as a passenger car, a truck, or a train, and in particular, to a winding structure of a rotor coil wound around a winding drum portion of a bobbin.

BACKGROUND ART

In a conventional rotating electric machine rotor coil, cross points of a coil wire are arranged at 40 to 80 degrees in the circumferential direction so as not to overlap each other in the radial direction (for example, Patent Document 1).

In another example, the positions of cross points of a coil wire are sequentially shifted over the entire circumference in the circumferential direction so as to be dispersed (for example, Patent Document 2).

CITATION LIST

Patent Document

Patent Document 1: Japanese Patent No. 4347219
Patent Document 2: Japanese Examined Patent Publication No. 5-72731

SUMMARY OF THE INVENTION

Problems to be Solved by the Invention

In the conventional rotor coil of Patent Document 1, a coil wire is wound in seven rows and four stages around a bobbin to form a coil field A, further wound in four rows and one stage, and then wound by one revolution thereon to form a coil field mountain winding portion. In the coil field A, the cross points in the respective stages of the coil wire do not overlap each other in the radial direction. However, since the relationship between the cross points in the coil field A and the cross points in the mountain winding portion is not particularly set, if the cross points in the coil field A and the cross points in the mountain winding portion are set substantially at the same position, the outer diameter at these cross points is enlarged, and therefore it is further necessary to change the thickness of the winding drum portion. In addition, if the number of the layers is increased, there is a problem that the outer diameter enlargement cannot be completely absorbed by change in the thickness.

Further, if the respective cross points concentrate in one direction almost at the same position, there is a problem that the balance is deteriorated, resulting in an adverse effect on the rotor.

In Patent Document 2, while the cross points are formed over the entire circumference, it is necessary to shift each cross point to the front side in the circumferential direction. In this case, an area where there is no coil wire arises in the lower-layer coil field. For example, in the case where a mountain winding portion having plural rows and multi stages is formed around the outer circumference of the lower-layer coil field, the cross points in the lower-layer coil field are arranged at eight equally divided locations as shown in Patent Document 2, whereby an area where there is no coil arises in a ⅛ revolution range (an area where there is no coil wire as shown in the second layer in FIG. 2 in Patent Document 2 arises in a ⅛ revolution range). Therefore, in Patent Document 2, it is necessary to wrap a tape or the like around all the layers in which cross points are shifted, in order to prevent dropping of the coil wire in the upper layer including the mountain winding portion.

The present invention has been made to solve the above problems, and an object of the present invention is to obtain a rotating electric machine rotor that allows the cross point positions to be shifted, without changing the thickness of the winding drum portion and without using a tape or the like.

Solution to the Problems

A rotating electric machine rotor according to the present invention includes: a pair of pole cores each having a plurality of tapered nail-shaped magnetic poles and a columnar base portion, the nail-shaped magnetic poles being arranged at equiangular pitches in a circumferential direction on an outer circumferential edge of the base portion such that taper directions of the nail-shaped magnetic poles coincide with an axial direction and the nail-shaped magnetic poles are engaged with each other; a bobbin having a cylindrical winding drum portion and first and second flange portions extending outward in a radial direction from respective ends in the axial direction of the winding drum portion such that the bobbin is formed in a ring shape having a U-shaped cross section, the bobbin being held between root portions of the nail-shaped magnetic poles of the pair of pole cores and mounted to the base portion; and a rotor coil composed of: a lower coil field formed by winding a coil wire in plural rows in the axial direction and in multi stages around an outer circumference of the winding drum portion of the bobbin, the lower coil field having a cross point formed by the coil wire in a stage adjacent in the radial direction; and a mountain-wound coil field provided in a vacant space between an outer circumference of the lower coil field and an inner circumference of the nail-shaped magnetic poles, the mountain-wound coil field being formed by winding the coil wire around the outer circumference of the lower coil field so as to have plural stages and fewer rows than the rows in the lower coil field, the mountain-wound coil field having a cross point formed by the coil wire in a stage adjacent in the radial direction, wherein the cross point in the mountain-wound coil field and the cross point in the lower coil field are shifted from each other in a circumferential direction.

Effect of the Invention

The rotating electric machine rotor according to the present invention enables control of the balance without changing the thickness of the winding drum portion at the cross point part or with reduced change in the thickness. Since the entire winding drum portion can be reduced in diameter, the insulation between the outer circumferential part and the poles can be enhanced, and since the length of the coil wire for the same number of turns can be shortened owing to the diameter reduction, the magnetomotive force can be increased. In addition, it becomes unnecessary to use a tape or the like in the layer between the coil wires.

DESCRIPTION OF EMBODIMENTS

Embodiment 1

Figure 1:
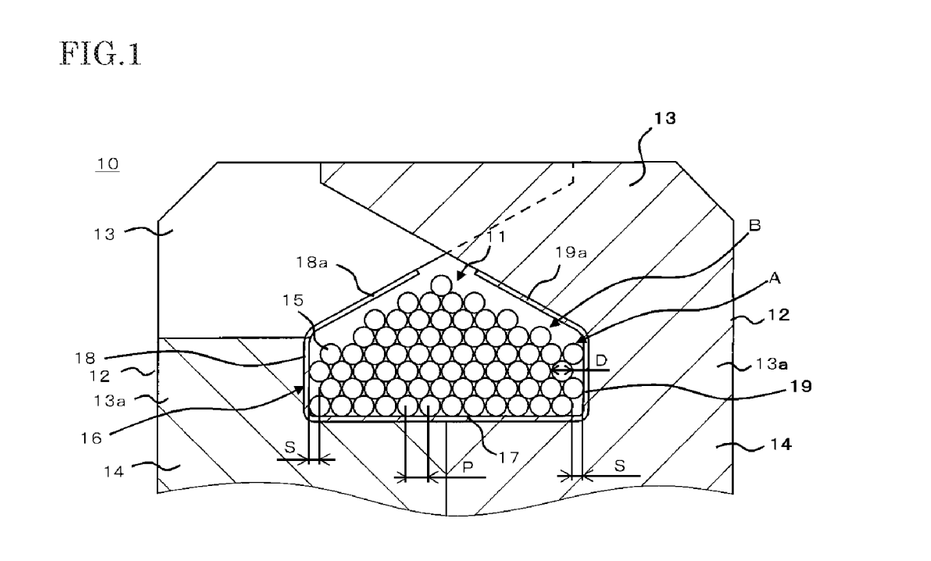
FIG. 1 is a sectional view showing a major part of a rotating electric machine rotor according to embodiment 1 of the present invention.
Figure 2:
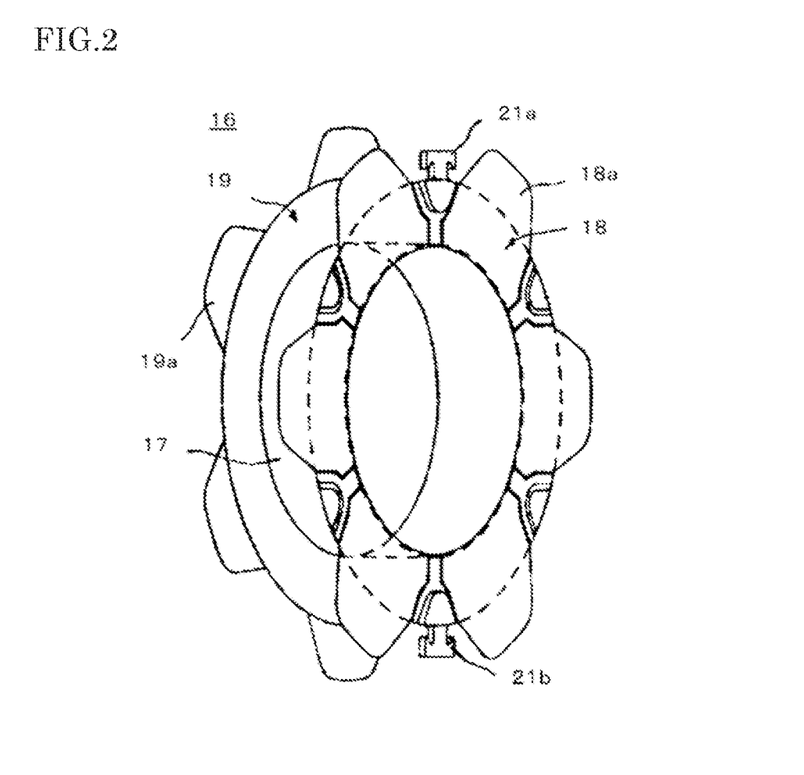
FIG. 2 is a perspective view showing a bobbin applied to the rotating electric machine rotor according to embodiment 1 of the present invention.
Figure 3:
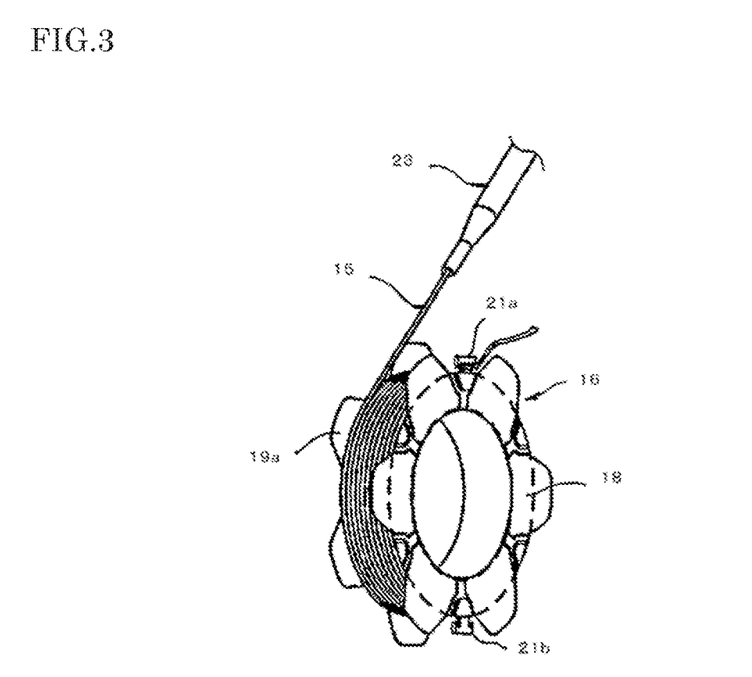
FIG. 3 is a perspective view showing the winding state of a rotor coil around the bobbin in the rotating electric machine rotor according to embodiment 1 of the present invention.
Figure 4:
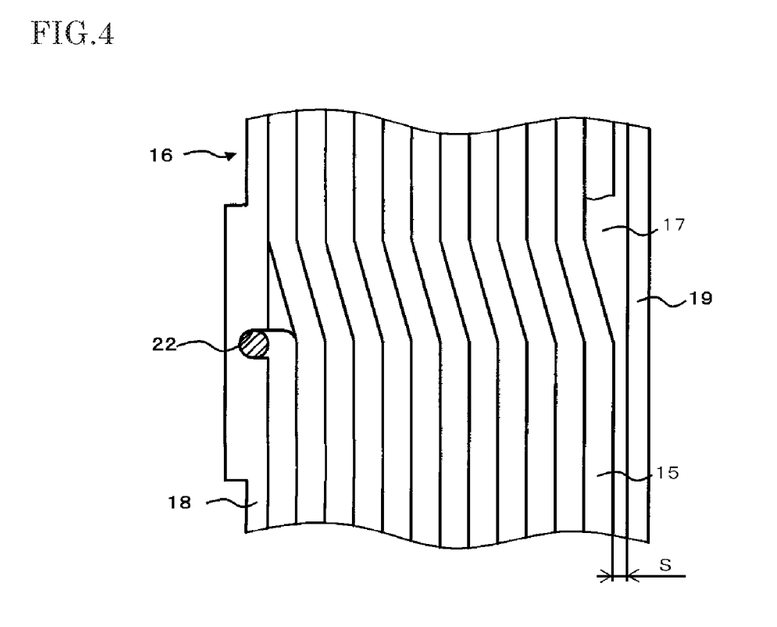
FIG. 4 is a process diagram illustrating the winding method for the rotor coil in the rotating electric machine rotor according to embodiment 1 of the present invention.
Figure 5:
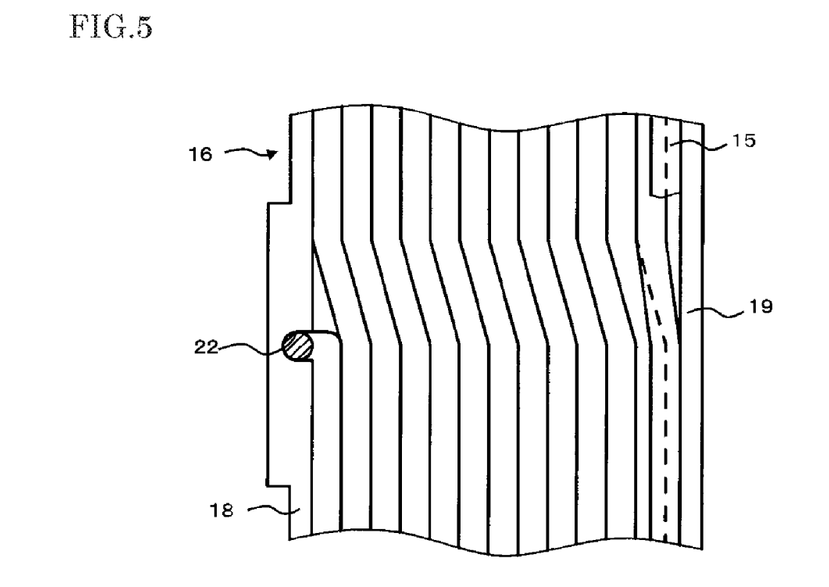
FIG. 5 is a process diagram illustrating the winding method for the rotor coil in the rotating electric machine rotor according to embodiment 1 of the present invention.
Figure 6:
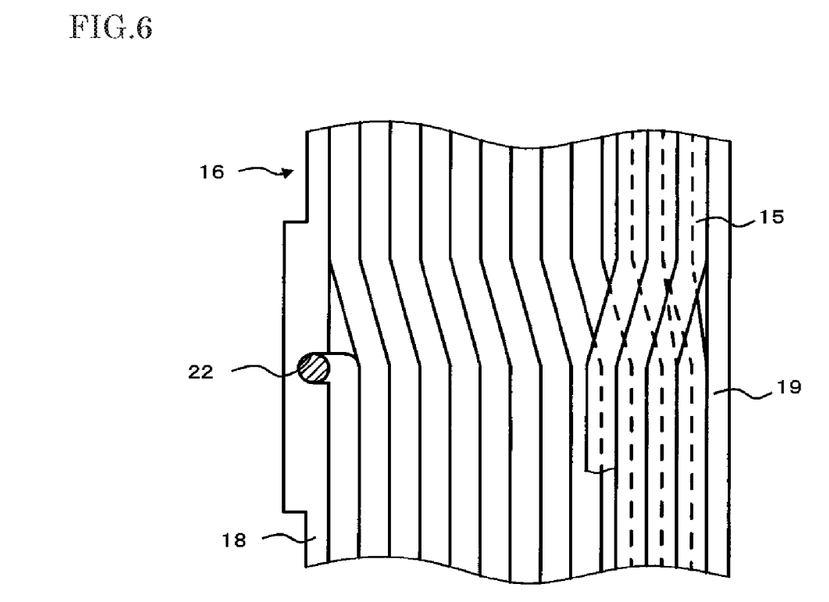
FIG. 6 is a process diagram illustrating the winding method for the rotor coil in the rotating electric machine rotor according to embodiment 1 of the present invention.
Figure 7:
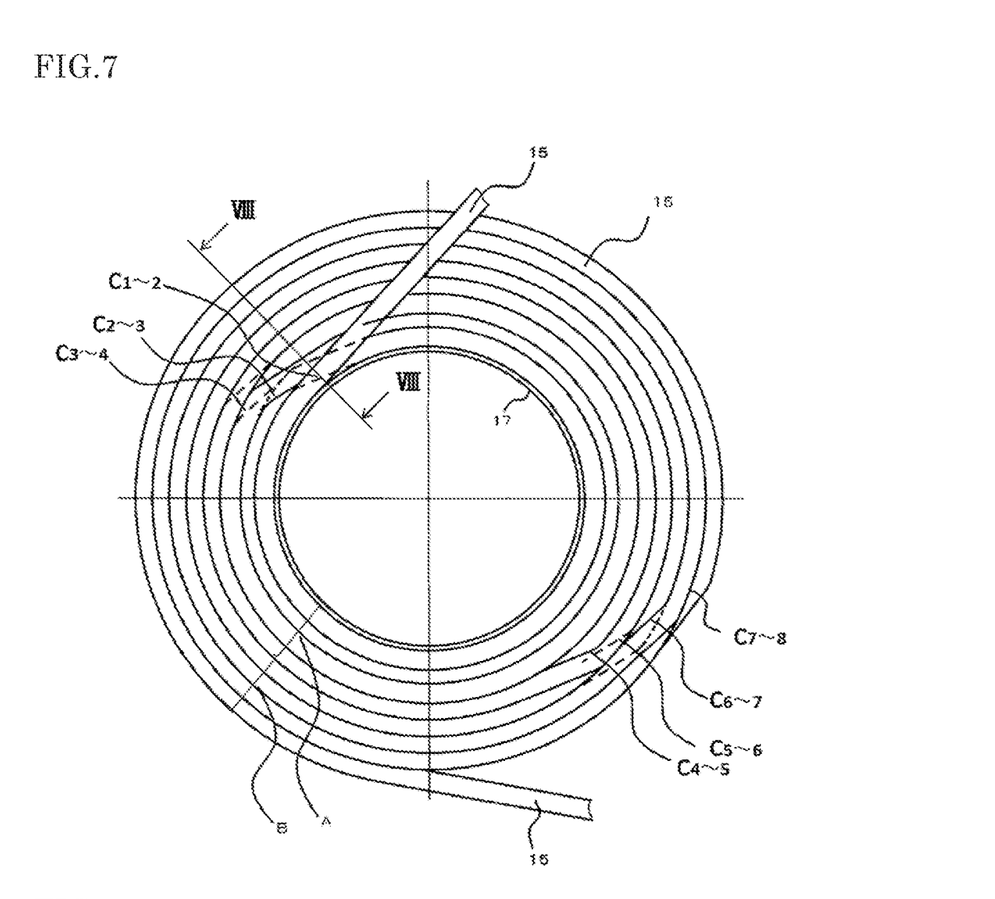
FIG. 7 is a sectional view showing the winding state of the rotor coil in the rotating electric machine rotor according to embodiment 1 of the present invention.
Figure 8:
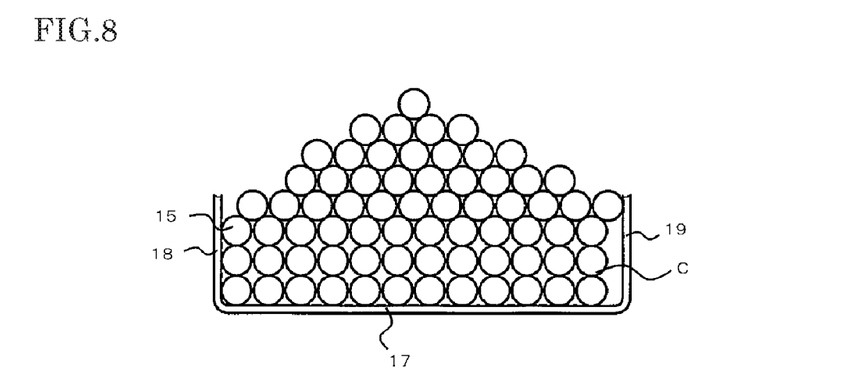
FIG. 8 is a sectional view along VIII-VIII line in FIG. 7.
Figure 9:
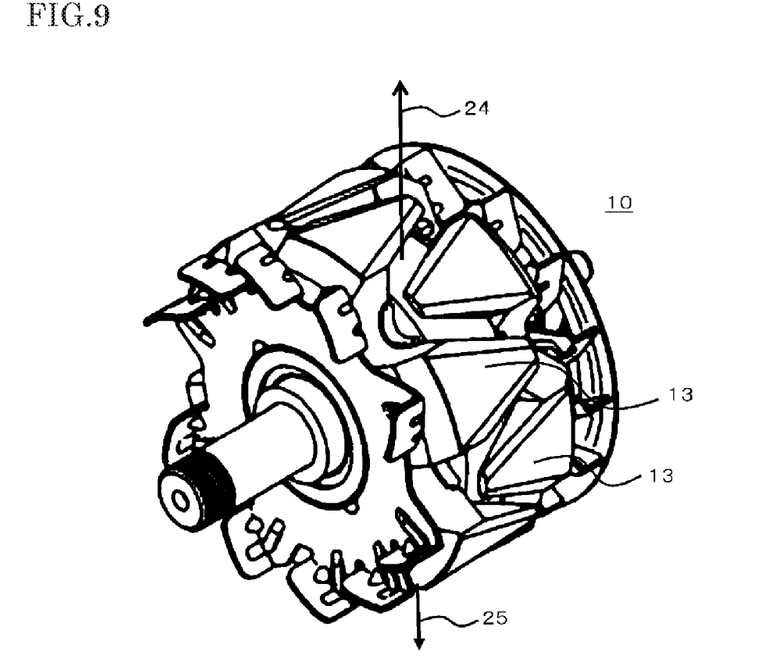
FIG. 9 is a perspective view of the rotating electric machine rotor according to embodiment 1 of the present invention.

FIG. 1 is a sectional view showing a major part of a rotating electric machine rotor according to embodiment 1 of the present invention. FIG. 2 is a perspective view showing a bobbin applied to the rotating electric machine rotor according to embodiment 1 of the present invention. FIG. 3 is a perspective view illustrating the winding method for a rotor coil in the rotating electric machine rotor according to embodiment 1 of the present invention. FIG. 4 to FIG. 6 are process diagrams illustrating the winding method for the rotor coil in the rotating electric machine rotor according to embodiment 1 of the present invention. FIG. 7 is a sectional view showing the winding state of the rotor coil in the rotating electric machine rotor according to embodiment 1 of the present invention. FIG. 8 is a sectional view along VIII-VIII line in FIG. 7. FIG. 9 is a perspective view showing the rotating electric machine rotor according to embodiment 1 of the present invention.

As shown in FIG. 1, the rotating electric machine rotor 10 is composed of: a rotor coil 11 to which current is applied to generate a magnetic flux; and a pair of pole cores 12 which are provided so as to cover the rotor coil 11 and in which magnetic poles are formed by the magnetic flux generated by the rotor coil 11.

Each pole core 12 is made of iron and has a columnar base portion 14 and a plurality of tapered nail-shaped magnetic poles 13 arranged at equiangular pitches in the circumferential direction on the outer circumferential edge of the base portion 14 such that the taper directions of the nail-shaped magnetic poles 13 coincide with the axial direction. The pair of pole cores 12 are fixed to a shaft (not shown), with the nail-shaped magnetic poles 13 opposed to each other in an engaged manner and with the end surfaces of the base portions 14 in contact with each other. Although not shown, shaft insertion holes are formed at the axis position of each base portion 14.

As shown in FIG. 2, the bobbin 16 has a winding drum portion 17 and first and second flange portions 18 and 19 extending outward in the radial direction from the respective ends in the axial direction of the winding drum portion 17, and is thus formed to be a ring shaped body having a U-shaped cross section. In addition, tongue pieces 18a and 19a for insulation are provided at equiangular pitches in the circumferential direction at the outer circumferential ends of the first and second flange portions 18 and 19, respectively. When the bobbin 16 is mounted to the pair of pole cores 12, the tongue pieces 18a and 19a are bent along the inner circumferential wall surfaces of the nail-shaped magnetic poles 13, thereby preventing direct contact between the rotor coil 11 and the nail-shaped magnetic poles 13. Further, a pair of fastening portions 21a and 21b are provided standing at the outer circumferential end of the first flange portion 18, and a groove 22 described later is formed in a depressed manner in the inner circumferential wall surface of the first flange portion 18 so as to lead from the outer circumferential end of the first flange portion 18 in the vicinity of the fastening portion 21a to the winding drum portion 17.

The bobbin 16 is housed in the space formed by the nail-shaped magnetic poles 13 and the base portions 14 of the pair of pole cores 12, such that the winding drum portion 17 is mounted to the base portion 14 and the bobbin 16 is held between root portions 13a of the nail-shaped magnetic poles 13 from both sides (right and left sides in FIG. 1). Then, the rotor coil 11 is formed by winding a coil wire 15 around the outer circumference of the winding drum portion 17 in multi stages so as to have the same number of rows in the axial direction in each stage. Here, the coil wire 15 is wound so as to form a coil field A having twelve rows and four stages and a four-stage mountain-wound coil field B having a decreased number of rows in the axial direction.

Here, the winding method for the rotor coil 11 will be described.

The coil wire 15 is prepared by forming an insulation coat such as polyimide resin on the surface of a core material having a circular cross section and made of copper or the like. The coil wire 15 is fed from a nozzle 23, the end of the coil wire 15 is wound around the fastening portion 21a of the bobbin 16 mounted to a spindle or the like (not shown), and then is led through the groove 22 to the winding drum portion 17.

Then, as shown in FIG. 3, while the coil wire 15 is fed from the nozzle 23, the bobbin 16 is rotated to wind the coil wire 15 around the winding drum portion 17. At this time, the nozzle 23 is moved in the axial direction of the bobbin 16, whereby the first stage of the coil wire 15 is formed around the winding drum portion 17. As shown in FIG. 4, the coil wire 15 in the first stage extends through the groove 22 to the winding drum portion 17, and then is turned substantially by one revolution around the winding drum portion 17 while being in contact with the inner circumferential wall surface of the first flange portion 18. Subsequently, the coil wire 15 is shifted toward the second flange portion 19 side by one line of the coil wire 15 and turned substantially by one revolution around the winding drum portion 17 while being in contact with the first turn of the coil wire 15. Thus, in the same manner, the coil wire 15 is turned by twelve revolutions in total around the winding drum portion 17. At this time, a gap S is formed between the twelfth turn of the coil wire 15 in the first stage and the inner circumferential wall surface of the second flange portion 19.

Subsequently, the second stage of the coil wire 15 is wound on the first stage of the coil wire 15. First, as shown in FIG. 5, the coil wire 15 is moved onto the twelfth turn of the coil wire 15 and is turned substantially by one revolution while being in contact with the inner circumferential wall surface of the second flange portion 19. Then, as shown in FIG. 6, the coil wire 15 is shifted toward the first flange portion 18 side by one line of the coil wire 15 and is turned around the winding drum portion 17 substantially by one revolution while being in contact with the first turn of the coil wire 15 in the second stage and in contact with the eleventh and twelfth turns of the coil wire 15 in the first stage. Thus, in the same manner, the coil wire 15 is turned around the winding drum portion 17 by twelve revolutions in total.

Through repetition of such a winding process for the coil wire 15, the coil wire 15 is wound around the winding drum portion 17 to reach a height equivalent to the height of the root portion 13a of the nail-shaped magnetic pole 13, thereby forming the lower coil field A. In the coil field A, the coil wire 15 is wound such that cross points $C_{1-2}$, $C_{2-3}$, $C_{3-4}$ when the coil wire 15 is shifted to each stage are shifted from each other by an angle of 10 degrees in the circumferential direction of the bobbin 16 as shown in FIG. 7. Thereafter, in forming the coil field B, the coil wire 15 ascends to the next layer, at the front side by 180 degrees in the circumferential direction relative to the cross points in the coil field A, whereby a cross point part in the coil field B is formed at the opposite side by 180 degrees relative to the cross point part in the coil field A part. Then, the coil wire 15 is further wound in nine rows and one stage, further wound in seven rows and one stage thereon, further wound in four rows and one stage thereon, and further wound by one revolution thereon, thereby forming the mountain-wound coil field B part. In the coil field B, the coil wire 15 is wound such that cross points $C_{4-5}$, $C_{5-6}$, $C_{6-7}$, $C_{7-8}$ when the coil wire 15 is shifted to each stage are shifted from each other by an angle of 10 degrees in the circumferential direction of the bobbin 16 as shown in FIG. 7. Then, the coil wire 15 extending from the nozzle 23 is cut and the cut side of the coil wire 15 is wound around the fastening portion 21b, whereby the rotor coil 11 shown in FIG. 3 is obtained.

In the rotor 10, since the coil field B is formed above the coil field A, the number of turns of the coil wire 15 can be increased by using the vacant space between the outer circumference of the coil field A and the inner circumference of the nail-shaped magnetic poles 13 of the pole cores 12. Thus, the magnetomotive force of the rotor coil 11 increases, whereby output of the rotating electric machine can be enhanced.

In addition, since the coil field B is formed with fewer rows than the rows in each stage of the coil field A, the coil field B can be provided in the vacant space between the coil field A and the nail-shaped magnetic poles 13 of the pole cores 12, without being in contact with the nail-shaped magnetic poles 13.

Here, the coil field B is to be formed in plural stages with fewer rows than the rows in each stage of the coil field A. In addition, mountain winding is performed so that the number of rows in each stage of the coil field B is gradually decreased toward the upper stage in accordance with the shape of the vacant space between the coil field A and the nail-shaped magnetic poles 13 of the pole core 12.

If a cross point part is shifted by 180 degrees in the coil field A, an area where there is no coil arises in the 180-degree range up to the cross point part formed thus far. As a result, regular winding cannot be performed in the next layer, and the entire coil to be wound thereon cannot be regularly wound. However, at the time of transferring to the coil field B in which the number of rows in the axial direction decreases in the next layer, it becomes possible to shift the cross point. The cross point part may be shifted at any location, in the last layer of the coil field A, on which the coil field B is not present. Alternatively, the cross point part may be shifted in the coil field B, at the time of transferring to the coil field B.

In the rotor coil 11 formed as described above, as shown in FIG. 1, the coil field A part with twelve rows and four stages is formed around the winding drum portion 17 of the bobbin 16, and the coil field B part is formed thereon. In the lower coil field A part, in the odd-number stages, the first turn of the coil wire 15 is wound in contact with the inner circumferential wall surface of the first flange portion 18 and then the subsequent turns are wound in contact with each other, by twelve revolutions in total, such that the gap S is formed between the twelfth turn of the coil wire and the inner circumferential wall surface of the second flange portion 19. On the other hand, in the even-number stages, the first turn of the coil wire 15 is wound in contact with the inner circumferential wall surface of the second flange portion 19 and then the subsequent turns are wound in contact with each other, by twelve revolutions in total, such that the gap S is formed between the twelfth turn of the coil wire 15 and the inner circumferential wall surface of the first flange portion 18. For example, since the first turn of the coil wire 15 in the second stage is wound in contact with the inner circumferential wall surface of the second flange portion 19, the first turn of the coil wire 15 in the second stage presses the twelfth turn of the coil wire 15 in the first stage to the first flange portion 18 side, thereby acting to bring the twelve turns of the coil wire 15 in the first stage into close contact with each other. Accordingly, even when the coil wire 15 is sequentially wound for the second turn and then the third turn in the second stage, the close contact state of the coil wire 15 wound in the first stage is ensured. Also when the coil wire 15 is wound in the third stage and the fourth stage, the close contact state of the coil wire 15 wound in the lower stages is ensured in the same manner. That is, the regular winding state of the coil wire 15 in each stage in the lower regular winding part A is ensured.

Desirably, the gap S in FIG. 1 is set to be not less than D/4 and not greater than D/2, as described in Patent Document 1 (D is the diameter of the coil wire 15). In particular, if the gap S is set to D/2, the coil wire 15 can be wound in a stable state, and thus occurrence of winding disorder in the winding process is suppressed and the coil wire 15 can be wound in a regular state. As a result, the coil field A having an outer diameter uniformed in the axial direction can be easily formed, and the coil fields A and B that are unlikely to be collapsed can be achieved. Further, the number of turns of the coil wire 15 increases, and thus the magnetomotive force generated in the rotor coil 11 can be increased.

FIG. 7 is a sectional view showing the winding state of the rotor coil in the rotating electric machine rotor according to embodiment 1 of the present invention. FIG. 8 is a sectional view along VIII-VIII line in FIG. 7 which passes through the cross point $C_{1-2}$ formed when the coil wire 15 is wound in the second stage.

In FIG. 7, the coil field A which is the lower regular winding part of the rotor coil 11 is configured such that, as shown in FIG. 7, the coil wire 15 is wound in twelve rows and four stages around the winding drum portion 17 of the bobbin 16, and the cross points $C_{1-2}$, $C_{2-3}$, $C_{3-4}$ are shifted from each other by an angle of 10 degrees in the circumferential direction so as not to overlap each other in the radial direction. The transfer start position at which the coil wire 15 in the coil fields A and B is transferred by an arrangement pitch P in the axial direction is shifted in the circumferential direction in each stage. That is, the cross points $C_{1-2}$, $C_{2-3}$, $C_{3-4}$ formed when the coil wire 15 is wound in the second stage, the third stage, and the fourth stage are dispersed in the circumferential direction and do not overlap each other in the radial direction.

In addition, also in the coil field B, the cross points $C_{4-5}$, $C_{5-6}$, $C_{6-7}$, $C_{7-8}$ are shifted from each other by an angle of 10 degrees in the circumferential direction so as not to overlap each other in the radial direction. In addition, each pair of the cross points $C_{4-5}$ and $C_{1-2}$, the cross points $C_{5-6}$ and $C_{2-3}$, and the cross points $C_{6-7}$ and $C_{3-4}$ are shifted from each other by an angle of 180 degrees in the circumferential direction.

In winding the coil wire 15 in each stage (other than the first stage), when the coil wire 15 is transferred from the n1-th turn by the arrangement pitch P in the axial direction to be wound in the (n1+1)-th turn, the coil wire 15 moves over the top of the coil wire 15 present in the lower stage. The cross point C is a point at which the coil wire 15 moves over the top of the coil wire 15 present in the lower stage.

In the rotor coil 11, if the coil fields A and B are formed such that the cross points C overlap each other in the radial direction, the outer diameter of the coil fields A and B increases at the part where the cross points C overlap. The more the cross points C overlap, the greater the outer diameter of the coil fields A and B at the part where the cross points C overlap is. As a result, in the case where the rotor coil is mounted to the pole cores 12 to form the rotor, the coil wire 15 at the radially outermost position of the coil fields A and B at the part where the cross points C overlap comes into contact with the inner circumferential wall surface of each nail-shaped magnetic pole 13, whereby the insulation coat of the coil wire 15 is damaged. In addition, in order to avoid contact between the inner circumferential wall surface of the nail-shaped magnetic pole 13 and the coil wire 15 at the radially outermost position of the coil fields A and B at the part where the cross points C overlap, it is necessary to decrease the number of stages in the coil fields A and B, and thus the number of turns of the coil wire 15 is decreased.

Although each coil field is formed such that the cross points C are dispersed in the circumferential direction, there is still an increase in the outer diameter of the coil field due to formation of the cross points C. In Patent Document 1, by providing change in the thickness of the winding drum portion 17, the increase in the outer diameter is cancelled, thereby allegedly obtaining a coil field having a uniformed outer diameter.

On the other hand, in the present invention, the cross points in the coil field B are shifted by 180 degrees from the cross points in the coil field A to obtain a symmetric shape, whereby well-balanced coil fields can be obtained. Therefore, it becomes unnecessary to change the thickness of the winding drum portion 17. As a result, it becomes possible to increase the number of stages, in the coil fields A and B, that allows avoidance of contact between the coil wire 15 and the inner circumferential wall surface of each nail-shaped magnetic pole 13. Thus, a rotating electric machine can be obtained in which occurrence of damage of the insulation coat of the coil wire 15 is suppressed and the number of turns of the coil wire 15 is increased. In addition, the mold for the bobbin 16 is simplified, whereby occurrence of burr or the like can be suppressed.

In addition, even in the case of providing change in the thickness of the winding drum portion 17 as in Patent Document 1, since the cross point parts in the coil field A and the coil field B are shifted from each other by 180 degrees, the amount and range by which the thickness of the winding drum portion 17 is changed can be reduced.

In FIG. 8, the cross points C formed when the coil wire 15 is wound in the second stage overlap each other in the axial direction, but overlap of the cross points C in the axial direction is not involved with increase in the outer diameter of the coil fields A and B.

FIG. 9 is a perspective view showing the entire rotor. Arrow 24 indicates the direction of displacement of the gravity center of the rotor 10 excluding the coil fields. Arrow 25 indicates the direction of displacement of the gravity center of the coil fields. By displacing the cross point positions to any positions using the coil fields A and B, the direction of displacement of the gravity center of the coil fields is controlled to intentionally displace the position of the gravity center of the coil fields in a direction to cancel the arrow 24, whereby the rotor 10 with less displacement of the gravity center position can be obtained. Thus, the rotation balance can be improved, whereby effects of reduction in shaft deflection, rotation noise, and the like and of improvement in durability of bearings can be expected.

Embodiment 2

Figure 10:
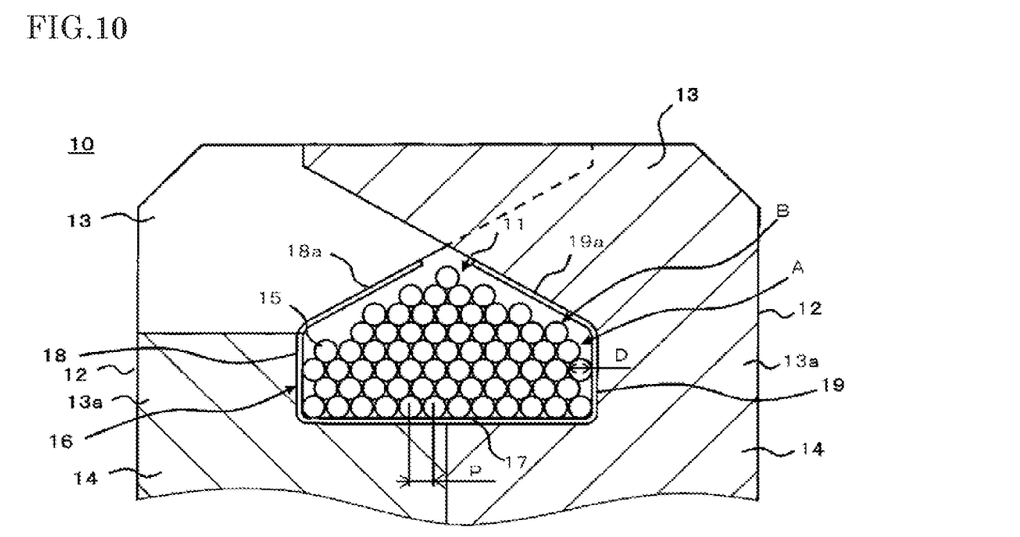
FIG. 10 is a sectional view showing a major part of a rotating electric machine rotor according to embodiment 2 of the present invention.

In FIG. 1, FIG. 4, FIG. 5, and FIG. 6, the odd-number layer and the even-number layer in the coil field A part have the same number of rows. However, as shown in FIG. 10, even in the case where the number of rows in the even-number layer is fewer by one row than the number of rows in the odd-number layer, the same operation and effect as in the above embodiment 1 are provided.

In the above embodiments, for convenience of description, it has been assumed that the coil field A is formed with twelve rows and four stages, and the coil field B is formed with four stages and fewer rows than those in the coil field A. However, the number of rows and the number of stages in the coil fields A and B are not limited thereto. Along with this, although in the case where there are only an upper part and a lower part as described above, the angle shift position may be at 180 degrees, in the case where the number of layers is increased so that there are many layers (upper part) in which the number of rows is decreased relative to the number of rows in the lower part, a plurality of angle shift positions, e.g., four positions at 90 degrees, may be provided.

Further, in the above embodiments, the case where the cross points C of the coil wire 15, formed in the respective stages in the lower coil field A are shifted from each other in the circumferential direction in an angle range of 10 degrees, has been shown as an example. However, for the purpose of reduction in the diameter of the rotor coil and downsizing thereof, an angle range of 3 degrees to 10 degrees is preferable. In addition, in the case where the coil fields A and B have a small number of stages in the radial direction, the shift angle in the circumferential direction may be 0 degrees in at least one of the coil fields A and B, and the balancing effect can be expected as long as the cross point part in the coil field A and the cross point part of the mountain-wound coil field B are shifted from each other in the circumferential direction.

Further, in the above embodiments, the case where the pair of pole cores 12 are obtained by integrally forming cylinder parts which form the base portions 14 and to which the winding drum portion 17 for the rotor coil 11 is mounted, has been shown as an example. However, the cylinder parts may be separately provided.

Further, the rotor according to the present invention is applicable to rotating electric machines such as an AC generator, an AC motor, and an AC generator motor which are provided in vehicles such as a passenger car, a truck, or a train, for example.

The invention claimed is:

1. A rotating electric machine rotor comprising:
   a pair of pole cores each having a plurality of tapered nail-shaped magnetic poles and a columnar base portion, the nail-shaped magnetic poles being arranged at equiangular pitches in a circumferential direction on an outer circumferential edge of the base portion such that taper directions of the nail-shaped magnetic poles coincide with an axial direction and the nail-shaped magnetic poles are engaged with each other;
   a bobbin having a cylindrical winding drum portion and first and second flange portions extending outward in a radial direction from respective ends in the axial direction of the winding drum portion such that the bobbin is formed in a ring shape having a U-shaped cross section, the bobbin being held between root portions of the nail-shaped magnetic poles of the pair of pole cores and mounted to the base portion; and
   a rotor coil composed of:
      a lower coil field formed by winding a coil wire in plural rows in the axial direction and in multi stages around an outer circumference of the winding drum portion of the bobbin, the lower coil field having a cross point formed by the coil wire in a stage adjacent in the radial direction; and
      a mountain-wound coil field provided in a vacant space between an outer circumference of the lower coil field and an inner circumference of the nail-shaped magnetic poles, the mountain-wound coil field being formed by winding the coil wire around the outer circumference of the lower coil field so as to have plural stages and fewer rows than the rows in the lower coil field, the mountain-wound coil field having a cross point formed by the coil wire in a stage adjacent in the radial direction,
   wherein the cross point in the mountain-wound coil field and the cross point in the lower coil field are located at symmetric positions by 180 degrees in the circumferential direction of the bobbin,
   the cross points of the coil wire, formed in the respective stages in the lower coil field are shifted from each other in the circumferential direction in an angle range of 3 degrees to 10 degrees,
   the cross points of the coil wire, formed in the respective stages in the mountain-wound coil field are shifted from each other in the circumferential direction in an angle range of 3 degrees to 10 degrees.

2. The rotating electric machine rotor according to claim 1, wherein the winding drum portion of the bobbin has a uniformed thickness over the entire circumference.

3. The rotating electric machine rotor according to claim 2, wherein the mountain-wound coil field has the same number of plural stages as the number of stages in the lower coil field.

* * * * *